United States Patent
Kusters

[15] 3,698,792
[45] Oct. 17, 1972

[54] OPTICALLY TRANSPARENT ACOUSTIC WAVE TRANSDUCER

[72] Inventor: John A. Kusters, San Jose, Calif.
[73] Assignee: Hewlett-Packard Company, Palo Alto, Calif.
[22] Filed: Dec. 28, 1970
[21] Appl. No.: 101,632

[52] U.S. Cl. ...................350/149, 350/150, 350/161
[51] Int. Cl. ..............................................G02f 1/24
[58] Field of Search.........350/147, 149, 150, 157, 160-161; 310/9.7, 9.8

[56] References Cited

UNITED STATES PATENTS

| | | | |
|---|---|---|---|
| 3,165,651 | 1/1965 | Bechmann | 310/9.7 |
| 3,499,704 | 3/1970 | Land et al. | 350/149 |
| 3,593,214 | 7/1971 | Cooper | 310/9.7 |
| 3,591,813 | 7/1971 | Coquin et al. | 350/161 |
| 3,461,408 | 8/1969 | Onoe et al. | 350/149 |
| 3,437,399 | 4/1969 | Eden | 350/149 |

OTHER PUBLICATIONS

Harris et al., " Electronically Tunable Acousto–Optic Filter" App. Phys. Lett. Vol. 15, No. 10 (Nov. 15, 1969) pp. 325– 326

Harris et al., " Acousto–Optic Tunable Filter" J.O.S.A. Vol. 59, No. 6 (June 1969) pp. 744– 747

Harris et al., "CaMoO₄ Electronically Tunable Optical Filter" App. Phys. Lett. Vol. 17, No. 5 (Sept. 1, 1970) pp. 223–225 350/149

*Primary Examiner*—David Schonberg
*Assistant Examiner*—Paul R. Miller
*Attorney*—Roland I. Griffin

[57] ABSTRACT

An acoustic wave transducer mounted on the input face of a body of optically anisotropic birefringent material is provided with an electrode structure for permitting substantially unobstructed passage of a light beam through the transducer and into the body of optically anisotropic birefringent material and for producing a tangential electric field in the transducer to generate an acoustic wave that propagates collinearly with the light beam into the body of optically anisotropic birefringent material.

7 Claims, 4 Drawing Figures

PATENTED OCT 17 1972 3,698,792
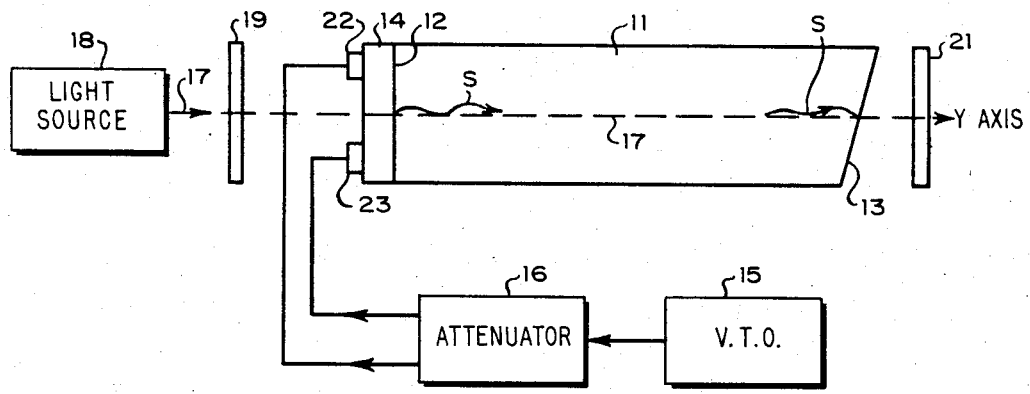
Figure 1
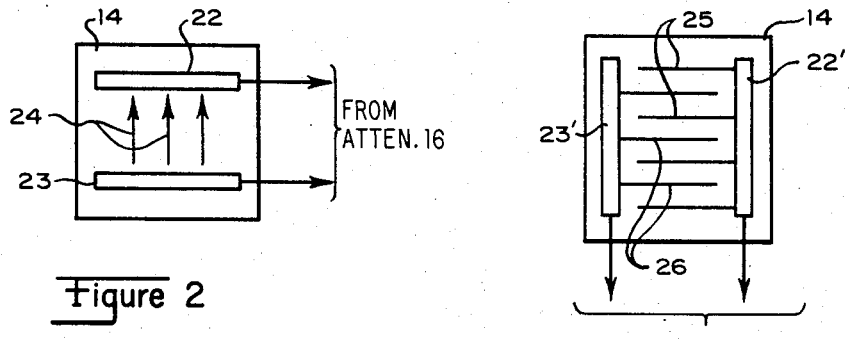
Figure 2
Figure 3
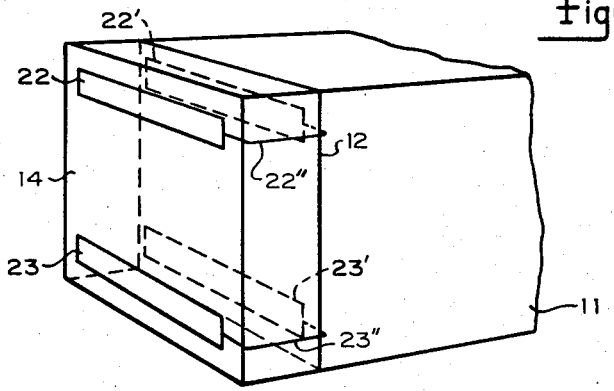
Figure 4
INVENTOR
JOHN A. KUSTERS
BY Roland J. Griffin
ATTORNEY

OPTICALLY TRANSPARENT ACOUSTIC WAVE TRANSDUCER

BACKGROUND OF THE INVENTION

Electronically tunable acousto-optic filters have been constructed wherein light of a first polarization traveling collinearly with an acoustical wave through an optically anisotropic medium, such as a birefringent crystal, is diffracted off the acoustical wave from the first polarization into a second polarization. The light of the second polarization may be separated from that of the first polarization at the output. The frequencies of the acoustic wave and the light are related such that the bandpass characteristics of the acousto-optic filter may be changed or tuned over a range of optical frequencies by varying the frequency of the acoustic wave. Such an acousto-optic filter is disclosed in an article entitled "Acousto-Optic Tunable Filter" appearing in the Journal of the Optical Society of America, Vol. 59, No. 6 of June 1969, pages 744–747, and in an article entitled "Electronically Tunable Acousto-Optic Filter" appearing in the Applied Physics Letters, Vol. 15, No. 10, of 15 Nov. 1969, pages 325 and 326.

In acousto-optic filters constructed to date, the acoustic wave has been directed along one axis of the crystal collinear with the optical beam axis by introducing the acoustic wave into the crystal through one side and then reflecting it off an input end wall of the crystal and along the desired axis. The optical beam is then introduced through the input end wall along the desired axis and collinearly with the acoustic wave. Where the input end wall is angled for proper acoustic wave reflection, it does not provide optimum transmission characteristics for the optical beam, resulting in decreased apertures and undesired transmission losses.

For example, in a calcium molybdate crystal with an input end wall cut to provide proper axial propagation of the acoustic wave, the input end wall or face is beyond optical cutoff for the incoming light, and thus additional techniques must be employed to bring the light into the filter.

Optical index matching materials have been employed to improve the optical transmission characteristics. These include fluid baths through which the optical beam is passed before transmission into the input end of the crystal.

Other filters have been proposed where both the acoustic wave and the optical beam are directed collinearly through an input end wall oriented normal to the axis of travel of the optical beam through the filter medium. To accomplish this, an optically transparent acoustic wave transducer is employed at the input end wall, this transducer being supplied with thin film optically transparent electrodes, such as tin oxide and indium oxide, for exciting the transducer at the acoustic frequency. The optical transparency of these films is limited. For example, only 50 percent of the incident light may pass into the filter medium.

SUMMARY OF THE PRESENT INVENTION

In the present invention a novel optically transparent acoustic wave transducer is employed for use in introducing the acoustic wave into the normal input face of an acousto-optic filter crystal. At least one face of the acoustic transducer is provided with an electrode structure which produces a tangential electric field at the face of the transducer to energize the transducer at the acoustic frequency. The electrode structure comprises spaced-apart conductors which permit the optical beam to pass therebetween and through the transducer into the filter crystal with very little loss of light.

In one embodiment, the electrode structure is located on the outside face of the acoustic transducer. In another embodiment, the electrode structure comprises electrodes on both the outside face of the transducer and the face adjacent to the input end surface of the filter crystal.

In one embodiment of the transducer, a rotated Y-cut lithium niobate crystal is employed for the transducer.

DESCRIPTION OF THE DRAWINGS

FIG. 1 is a diagrammatic view of an acousto-optic filter employing the present invention.

FIG. 2 is an end view of the filter structure of FIG. 1 looking from polarizer 19 and showing one form of electrode structure on the acoustic transducer.

FIG. 3 is a view similar to FIG. 2 showing a different electrode configuration.

FIG. 4 is an end view of an acousto-optic filter illustrating another embodiment of the acoustic transducer.

DESCRIPTION OF THE EMBODIMENTS

Referring now to FIG. 1, one form of acousto-optic filter made in accordance with the present invention comprises a suitable anisotropic medium 11, for example, the birefringent crystal calcium molybdate ($CaMoO_4$), 1 centimeter square in transverse cross section and 10 centimeters in length provided with input and output end surfaces 12 and 13, respectively. Input end surface 12 is normal to the longitudinal axis of the main body 11, hereafter referred to as the Y-axis. The Z-axis is perpendicular to the plane of the drawing and the X-axis extends in the vertical direction relative to the drawing.

An acoustical transducer 14 is mounted in intimate contact with the end surface 12 of the crystal 11 and is connected to a suitable signal generator or source 15, such as a voltage tunable oscillator, the frequency of which can be varied by varying the input voltage thereto. The RF output of the voltage tunable oscillator 15 is fed via an adjustable attenuator 16 to the acoustic transducer 14 for generating an acoustic shear wave, S, which is propagated along the Y-axis of body 11.

An optical beam 17 from source 18, for example visible light in the case of a $CaMoO_4$ medium, is transmitted into the body 11 through transducer 14 and the input surface 12, passes along the Y-axis of the body and exits through the output end 13. This light is polarized in a first direction along the Z-axis by the linear polarizer 19. To observe or otherwise utilize that portion of the light that is diffracted from the light beam by the acoustic wave, an output linear polarizer 21 with an axis of polarization along the X-axis is positioned in the path of the output beam, and passes that light which is polarized orthogonally to the polarization of the input beam 17.

The acoustic shear wave and the input light beam 17 propagate collinearly along the Y-axis of the crystal 11 and, for a particular combination of light wave and acoustic wave frequencies, there is found to be a strong interaction between the light and the acoustic wave in which the acoustic wave diffracts light polarized in the first direction. This yields a narrow pass band of light waves of orthogonal polarization which are then separated from the input light waves by linear polarizer 21. This narrow pass band of light waves is a function of the applied acoustical frequency and can therefore be varied in frequency by varying the frequency of excitation supplied by the voltage tunable oscillator 15. The acoustic shear wave S is reflected off the slanted end face 13 and thus removed from the interaction path.

This collinear diffraction occurs as a cumulative effect for a very narrow band of light frequencies, and it is non-cumulative by incremental self-cancellation for other frequencies. The cumulative diffraction effect occurs when the momentum vectors of the incident light and acoustic waves satisfy the relation that their sum equals that of the output light beam. This condition is called "phase matching". A narrow band of light frequencies satisfying this relation and diffracted into the orthogonal polarization is then passed by the output analyzer 21 while the light of the initial polarization is blocked. If desired, the output polarizer 21 may be polarized in the Z direction to pass the non-diffracted light and block the diffracted portion of light.

In one embodiment of this invention, the novel optically transparent transducer 14 comprises a rotated Y-cut of lithium niobate ($LiNbO_3$) having a pair of spaced-apart electrodes 22 and 23 formed on its outer surface by suitable techniques, for example vapor deposition through a mask. The surface normal (i.e. the normal to the major surface) of this transducer is rotated approximately 58.6° from the positive crystalline Y-axis toward the negative Z, or optical, axis. This orientation displays a good excitation efficiency for tangentially excited thickness shear waves. The pair of electrodes 22 and 23 are positioned a suitable distance apart. For example one half wavelength of the acoustic wave would theoretically be good. However, this gives a limited optical aperture and, in practice, a spacing of several millimeters is preferred.

The transducer is affixed to the end of the body 11 by an optically transparent epoxy, such as Boxer Epoxy available from Edmond Scientific Co. as catalog item No. 40,674, using the bonding technique described in U.S. Pat. No. 3,453,166, issued July 1, 1969 to D. R. Herriott et al. In this configuration, the electrodes 22 and 23 are on the outer surface of the transducer for easy connection with the low frequency source.

As shown in FIG. 2, the Electric field E produced by this electrode structure extends in the direction indicated by arrows 24, i.e. tangential or parallel to the outer surface of the transducer, as distinguished from the transverse electric field established across the transducers (i.e. in the Y-axis direction of FIG. 1) of prior design.

Another form of electrode structure is shown in FIG. 3 wherein the pair of electrodes 22' and 23' are interdigital, the separate fingers 25 and 26 being about 1 to 2 microns wide and being spaced apart about 35 microns.

The electrodes of FIGS. 2 and 3 may incorporate matching electrodes positioned on the inner surface of transducer 14 adjacent to the end wall of the body 11 as shown in FIG. 4 wherein electrodes 22 and 23 have matching electrodes 22' and 23', respectively. Each of these extra inner electrodes (e.g. 22') is electrically connected in common to the associated one of the electrodes on the outer surface of the transducer (e.g. 22) as represented by electrical connections 22'' and 23''. Since making a connection to the inner electrode on the transducer may be difficult, the inner transducer electrode may actually be formed on the input face 12 of the filter body 11 and the connecting terminal brought out to one side wall of the body 11 for easy electrical connection, and thereafter the transducer 14 may be secured to the end wall over the inner electrodes with the matching electrodes in alignment.

This invention may be utilized with various filter mediums including, for example, quartz and lead molybdate, and may employ other transducer crystals, for example lithium tantalate.

I claim:

1. Apparatus for diffracting light from a first polarization to a second polarization, said apparatus comprising a body of optically anisotropic birefringent material, an optically transparent electro-acoustic transducer mounted at one end of said body, means for passing a light beam of the first polarization through said transducer into said body, an electrode structure mounted on said transducer for permitting passage of the light beam of the first polarization through said transducer and into said body, and means including said electrode structure for producing a tangential electric field in said transducer normal to the path of the light beam therethrough to generate an acoustic wave that propagates substantially collinearly with the light beam of the first polarization into said body, light of the first polarization being diffracted on the acoustic wave in said body and thereby shifted to the second polarization.

2. Apparatus as in claim 1 wherein said electrode structure comprises a pair of spaced-apart electrodes mounted on one surface of said transducer through which the light beam passes.

3. Apparatus as in claim 2 wherein said electrode structure further comprises a second pair of spaced-apart electrodes mounted on another surface of said transducer opposite said one surface.

4. Apparatus as in claim 2 wherein said pair of spaced-apart electrodes forms an interdigital structure.

5. Apparatus as in claim 2 including an acoustic frequency source coupled to said electrodes.

6. Apparatus as in claim 1 wherein said transducer comprises a rotated Y-cut lithium niobate crystal.

7. A transducer as in claim 6 wherein the surface normal of said crystal is rotated approximately 58.6° from the positive crystalline Y-axis toward the negative crystalline Z-axis.

* * * * *